Figure 1:
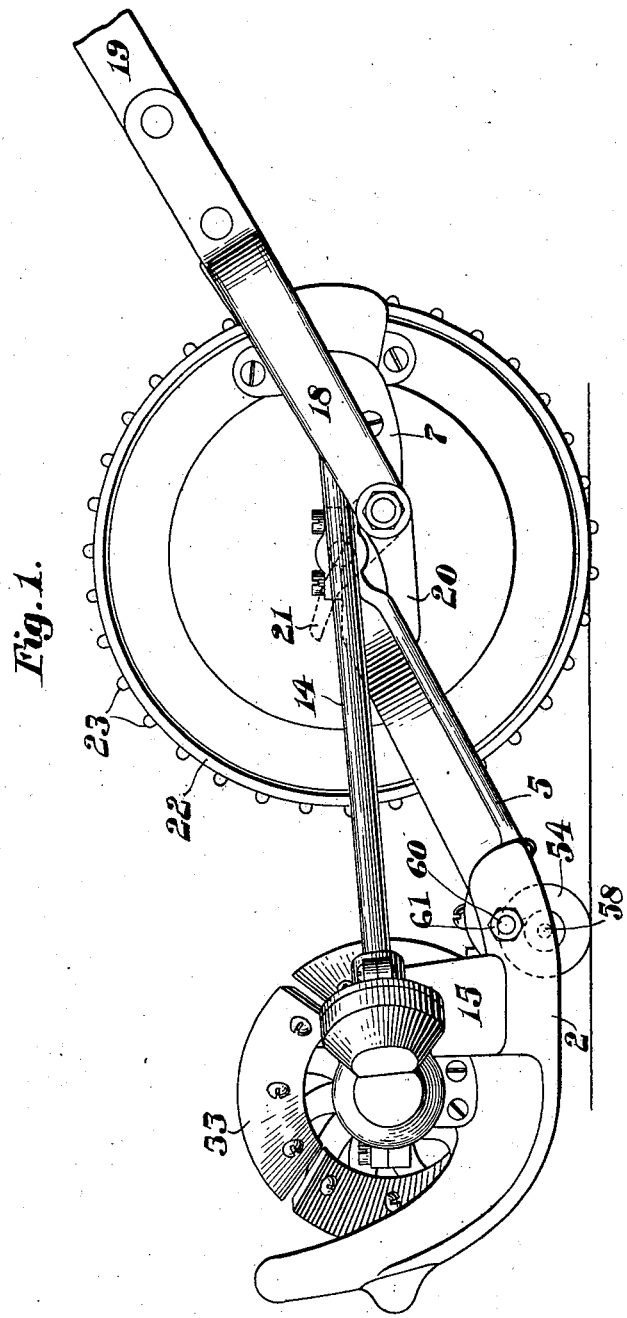

No. 751,378. PATENTED FEB. 2, 1904.
O. R. CHAPLIN.
LAWN MOWER.
APPLICATION FILED AUG. 10, 1903.
NO MODEL. 5 SHEETS—SHEET 1.

Witnesses:
Nathan C. Lombard 2nd
Robert W. Howard

Inventor:
Orril R. Chaplin,
by Charles F. N. Smith
Atty.

No. 751,378. PATENTED FEB. 2, 1904.
O. R. CHAPLIN.
LAWN MOWER.
APPLICATION FILED AUG. 10, 1903.
NO MODEL. 5 SHEETS—SHEET 3.
Fig. 3.
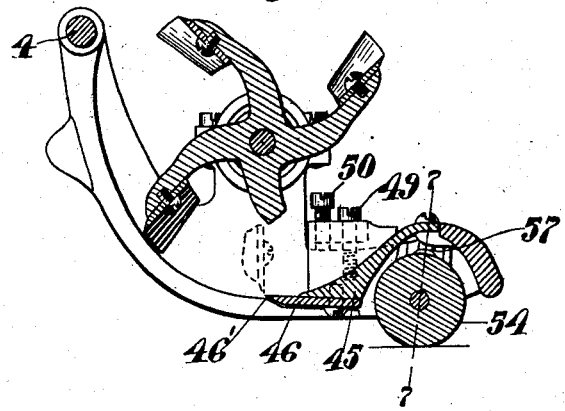
Fig. 4.
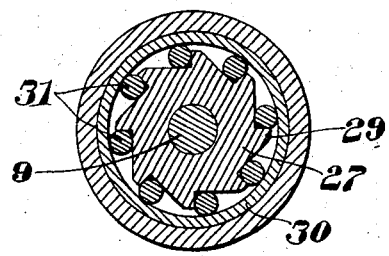
Fig. 5.  Fig. 9.  Fig. 6.
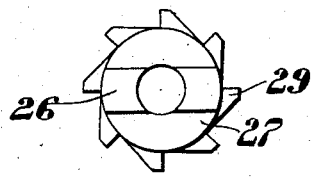 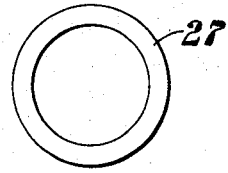 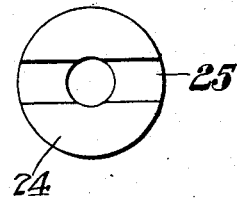
Fig. 7.  Fig. 8.
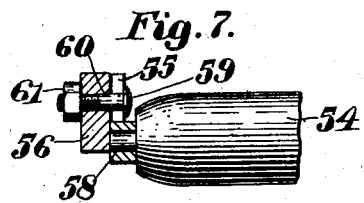 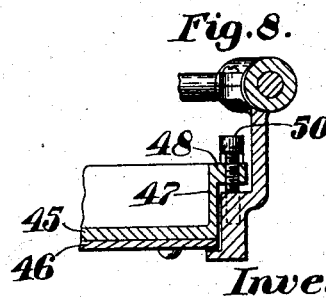
Witnesses:
Nathan C. Lombard 2nd
Robert W. Howard
Inventor:
Orril R. Chaplin,
by Charles F. A. Smith
Atty.

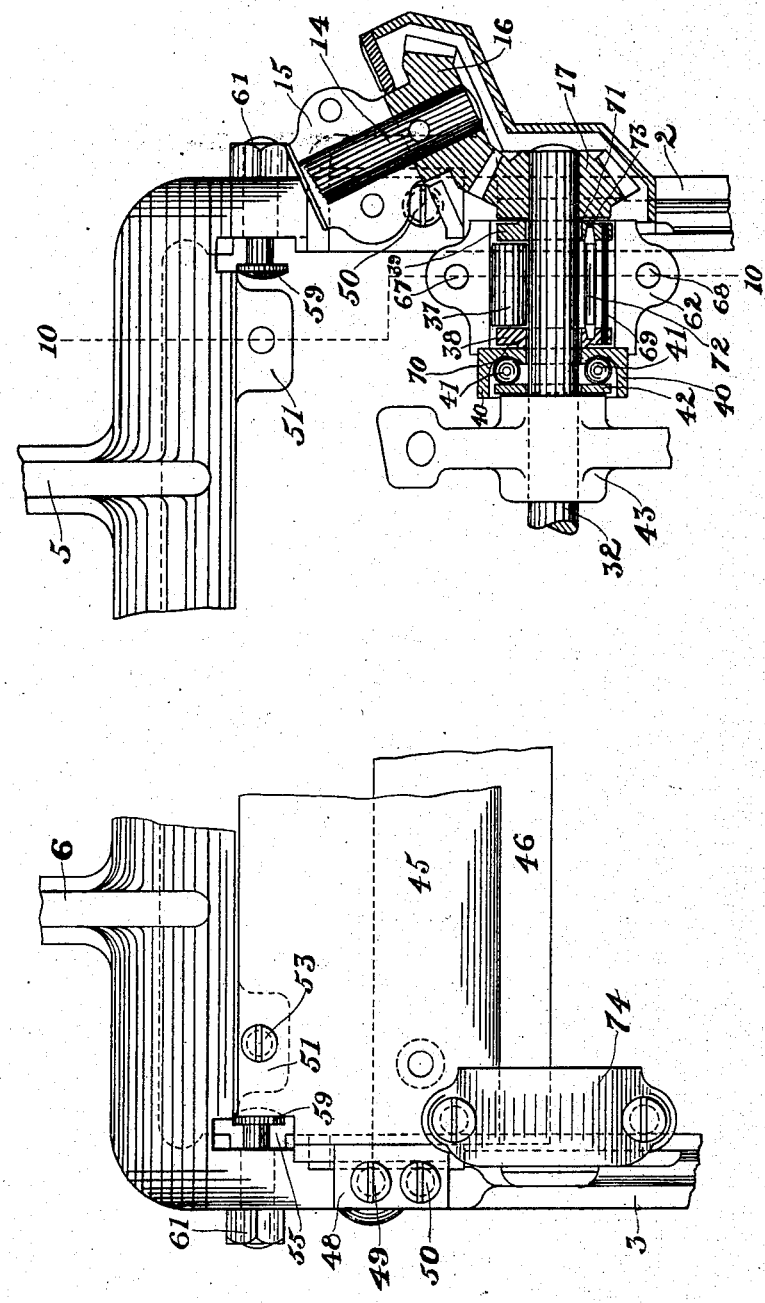

No. 751,378. PATENTED FEB. 2, 1904.
O. R. CHAPLIN.
LAWN MOWER.
APPLICATION FILED AUG. 10, 1903.
NO MODEL. 5 SHEETS—SHEET 5.
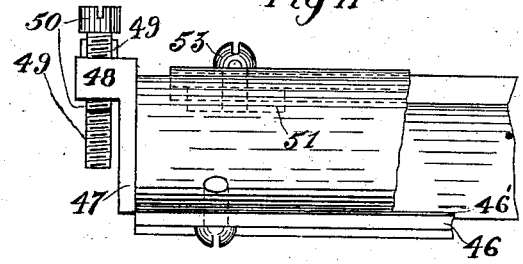
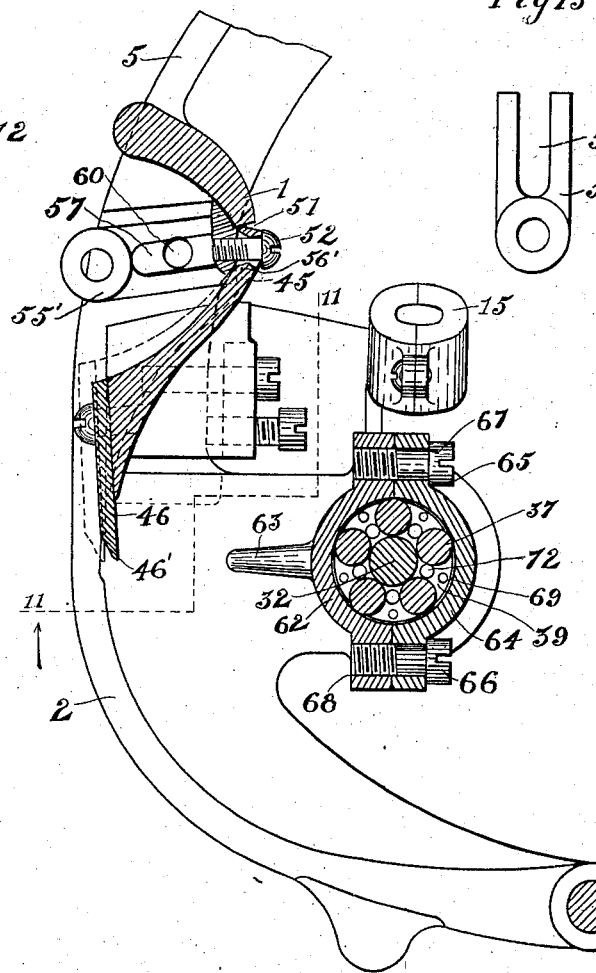
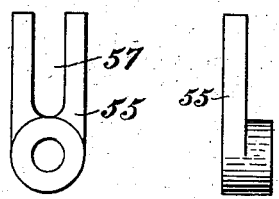
Witnesses:
Rose E. Doherty
Robert H. Irving
Inventor:
Orril R. Chaplin,
by Charles F. A. Smith
Atty.

No. 751,378. Patented February 2, 1904.

UNITED STATES PATENT OFFICE.

ORRIL R. CHAPLIN, OF BOSTON, MASSACHUSETTS, ASSIGNOR OF ONE-THIRD TO ROBERT W. HOWARD, OF BOSTON, MASSACHUSETTS.

LAWN-MOWER.

SPECIFICATION forming part of Letters Patent No. 751,378, dated February 2, 1904.

Application filed August 10, 1903. Serial No. 168,948. (No model.)

*To all whom it may concern:*

Be it known that I, ORRIL R. CHAPLIN, a citizen of the United States, residing at Boston, in the county of Suffolk and State of Massachusetts, have invented certain new and useful Improvements in Lawn-Mowers, of which the following is a specification, reference being had therein to the accompanying drawings.

My invention relates to certain improvements in mowers, and more particularly lawn-mowers, of that class in which a series of rotary knives act against a stationary cutting-bar; and the object of the invention is to greatly promote simplicity, expedite the cutting or mowing action, lessen cost of manufacture, and otherwise add to its utility, convenience, and facility of operation.

It consists also in certain improved adjusting and locking mechanism for said stationary cutter and in improvements to impart motion from the driving-wheel to the gearing mechanism and revolving cutters thereon and in which the cutters work easily with very little or no noise and are strong and durable, and the machine is so arranged as to be used for trimming close to the wall, in circles around paths, trees, shrubs, borders, beds, walks or edges, and in other places where a sickle or hand-shears are ordinarily used.

The stationary cutter and the revolving cutter or cutter-reel are held on the forward portion of the frame in advance of the drive-wheel, so that the drive-wheel travels in only the cut grass and allows the cutters to project out over the edge of the walk, so that the grass can be cut evenly without the use of hand-shears, as the cutters and supporting-roll adjust themselves to the uneven surface of the lawn.

The invention consists in the combination of elements and in certain parts of construction, entailed in the combination of said elements to obtain the desired result.

A full understanding of the invention can best be given by a detailed description of a preferred construction embodying the various features of the invention, and such a description will now be given in connection with the accompanying drawings, and I attain my object by the mechanism there illustrated, showing such preferred construction, and the features forming the invention will then be specifically pointed out in the claims.

Figure 2:
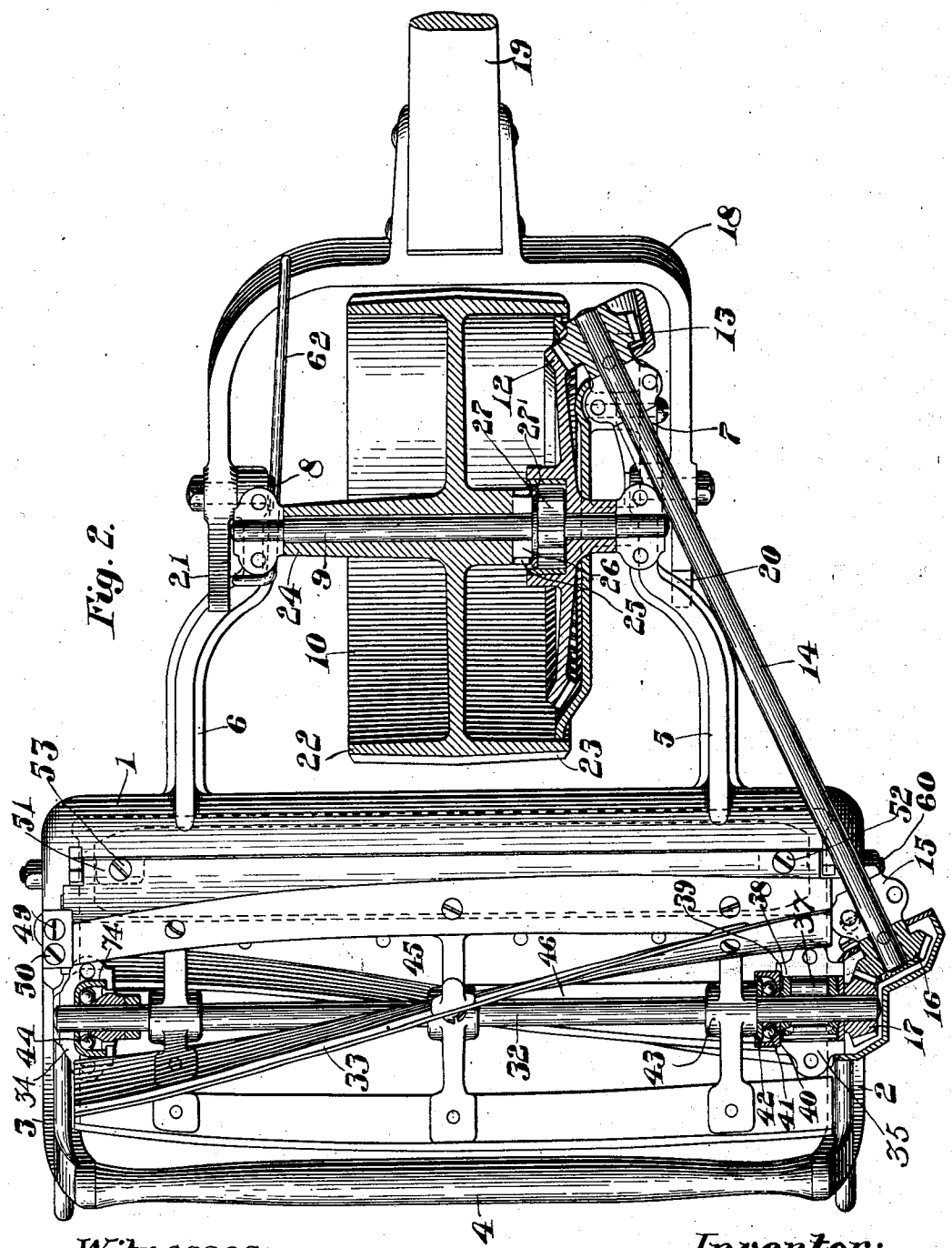

In said drawings, Figure 1 represents a side elevation of the apparatus, the handle-bar being broken away. Fig. 2 is a sectional plan of the same, also with the handle-bar broken away. Fig. 3 is a cross-sectional elevation showing a portion of the front part of the mower having part of my improvements applied thereto. Fig. 4 is a sectional view, on a large scale, of my new friction roller-clutch, which is contained in the large drive bevel-gear on the main shaft. Figs. 5, 6, and 9 are views of parts of the same on a reduced scale. Fig. 7 is a front view of part of the rear roller, showing one of its adjusting-screws on the line 7 7 of Fig. 3. Fig. 8 is a sectional view of part of the stationary or supplemental cutter and its contiguous parts, showing one of its adjusting-screws. Fig. 10 is a plan view, partly in section, of the front part of my lawn-mower with supporting-roller removed. Fig. 11 is a front view of part of the cutter-bar and knife on the line 11 11 of Fig. 12. Fig. 12 is a cross-sectional elevation on the line 10 10 of Fig. 10 with supporting-roller removed. Figs. 13 and 14 are front and side views of the upright sliding hangers.

Latitude is allowed herein as to details, as they may be changed or varied at will without departing from the spirit of my invention and the same yet remain intact and be protected.

Corresponding and like parts are referred to in the following description and indicated in all the views of the drawings by the same reference characters.

The mowing-machine is of that type or pattern in which a rotary cutting-reel works against a stationary cutter, and in carrying out my invention I provide a main frame which is preferably of one piece of cast metal, as it will be stronger and lighter than to have the parts bolted together, as the old machines are now. This main frame is composed of a rear bar 1, having forward-extending parallel side arms 2 and 3, curved or bent upwardly at their outer part and connected at their extreme ends by the rod or bar 4, so as to form a sort of inclosure for the revolving cutter, protecting said cutter to a large extent from injury and forming a guard in case of children, cats, or dogs running suddenly against the forward part of the machine. Extending rearwardly from the rear bar 1, which acts as a brace or guard board for the different parts and as a guard for the supporting-roller and stationary cutter, are the side arms 5 and 6, bent upwardly and inwardly, the extreme ends finally terminating in horizontally-parallel members 7 and 8, the member 7 extending farther rearward than the corresponding member 8 to support the driving-shaft, as hereinafter explained. In the upper part of these members 7 and 8 of the main frame 1 and in the center crosswise between the frame is journaled the shaft 9, having the narrow pivoted transporting or main drive wheel 10, this main drive-wheel 10 being loose on the main shaft 9. A large driving bevel-gear 12, loose on this same shaft 9, is connected to the ground or drive wheel 10 by the friction roller-clutch, as shown in Fig. 4 of the drawings, which clutch is contained in the large drive bevel-gear on the main shaft 9. This driving bevel-gear 12 meshes into a pinion 13, placed on a driving-shaft 14, which is journaled at one end to the extreme end of the member 7 of the main frame 1 and journaled at its other end to an upward-extending portion 15 of the arm 2 of the main frame 1. This driving-shaft is connected immediately forward of the portion 15 by two bevel-gears 16 and 17 to the revolving cutter-shaft in the forward part of the machine, as hereinafter explained.

Pivoted on each side of the frame and to the members 7 and 8 of the main frame 1 and below and rearward of the shaft 9 is a forked-shaped piece of metal casting 18, to which is connected the handle-bar 19, (which is shown broken away in Figs. 1 and 2,) which handle is used to push the machine forward or draw it backward. From this point of connection on one side of the machine and below the driving-shaft is an arm 20 of the forked piece 18, projecting forwardly and downwardly, the point coming in contact with the curved part of the arm 5 of the main frame on its under side, so the handle can be pressed down and the arms 5 and 6 tilted upwardly, elevating the main frame, and the arms 2 and 3 raising the cutters to pass any obstacle on the ground, as a rock or stick. The opposite side of the forked piece has an arm 21 projecting forwardly and upwardly on the opposite side of the machine, the point coming up over the arm 6 of the main frame, as shown in Figs. 1 and 2 of the drawings, so that lifting the handle will raise the ground or drive wheel 10 to pass over any obstructions. These arms 20 and 21 do not come flush against the frame; but a small space is allowed between the frame and these arms in order to oscillate the handle up or down freely.

The ground or drive wheel 10 consists of a rim 22, having on its periphery small ribs 23 across the rim, being provided with a web instead of spokes, and on the end of the hub 24 next the bevel-gear is a narrow slot 25 across the face end of the hub to receive the lug 26 on the side of the roller friction-clutch. This roller friction-clutch consists of a wheel 27, having a series of ratchet-shaped teeth 29 formed upon its periphery. Surrounding said ratchet is a metal ring 30, and placed within said ring and between each ratchet-tooth is a small steel roller 31, adapted to just fill the inner side of the circle and ring, causing friction in going forward. On the outside end of this ratchet-wheel is the projecting lug 26, which engages or fits into the narrow slot 25 on the hub of the drive-wheel, as hereinafter stated, and it will thus be seen that as the machine is pushed forward motion is imparted to the gearing and likewise to the revolving cutters, but as the machine is moved backward it will not cause the cutters to operate.

The reel or rotary cutter-shaft 32 is suitably journaled in the arms 2 and 3 of the main frame 1 and is provided with the spirally-arranged cutter-blades 33, which coöperate with the cutter-knife 46 at the periphery of the reel, and it has two journaled bearings 34 and 35 and one gear-pinion 17 to revolve this cutter 33, and the bearing next to the gear-pinion 17 is a roller-bearing, as shown in Fig. 2 of the drawings.

In the drawings, 62 is the shell or lower casing of the roller-bearing, cast on the arm 2 of the main frame 1 and strengthened by the web 63, and this shell has the cap 64, which is attached to it by the screws 65 and 66, which are screwed into the screw-holes 67 and 68. The cap, which is subject to greater wear than the lower shell, can therefore be readily and easily removed and easily replaced by a new cap whenever it becomes necessary. Within this casing and at each end thereof is mounted a roller-carrying frame composed of the two heads or collars 38 and 39 and the tie-rods 69, secured in said heads so as to maintain them at the proper distance apart. The heads or collars 38 and 39 are bushed with rings 70 and 71 of suitable material.

Numeral 37 designates a series of bearing-rollers each having a diameter equal to the distance between the exterior of the cutter-shaft 32 and the interior of the casing 62 and a length nearly equal to the distance between the inner faces of the heads or collars 38 and 39, said rollers being arranged around the cutter-shaft 32 at equal distances from each other, as shown in Figs. 2, 10, and 12. Between each two of the bearing-rollers 37 is a smaller roll 72, having its ends made frusto-conical and fitted to curved slots 73, formed in the heads or collars 38 and 39, the sides of which slots are inclined to fit the taper of the frusto-conical bearing ends of the rolls 72, the length of the slots 73 in the direction of the circumference of the head or collar being sufficient to permit a free movement on the bearing-rollers 37; but the rolls 72 are of such a diameter as to fill the spaces between the bearing-rollers 37 and maintain the bearing-rollers 37 at a uniform distance apart.

Against the head or collar 38 bears an annularly-grooved steel collar or disk 40, in which annular grooves rest a ball or balls 41, and within this collar 40 and against the ball 41, resting in the annular groove of the collar, is another steel collar 42, placed against the spider-hub 43, so as to take the end thrust of the cutter-shaft 32 in opposite direction. On the other end of the axle or cutter-shaft 32 is fitted in the casing or shell 74 a ball-bearing 44, as shown. The object of having two different bearings is that on the driving or gear end there is more wear and pressure and the roller-bearing is more durable than the ball-bearing; but on the other end of the shaft 32 there is not so much wear and the ball-bearing will do just as well.

The stationary cutter has under the cutter-bar 45 an under cutter or knife 46, secured thereto on its under side by screws, as shown in Fig. 3, and this cutter-bar has at each end a vertical stand 47 with a flange 48 projecting outward at the top, through which two adjusting-screws 49 and 50 pass. These two adjusting-screws are at each end of the cutter-bar and adjust the cutting edge of the cutters together. The screws 49 are loosely inserted through the holes in the flanges 48 and extend down to the arm 2 of the frame and are there tapped or screwed into the frame. The other screws 50 are tapped or screwed into and through tapped or threaded holes in the flanges and extend down to the frame and rest thereon. The cutter is further hinged or pivoted at the rear edge of the cutter-bar 45 to the projecting lugs or ears 51, cast on the main frame 1, whereon the rear edge of the cutter-bar rests and is secured by bolts or screws 52 and 53, forming a swinging joint. By this arrangement the front edge of the under cutter-bar 45 can conveniently and accurately be vertically adjusted by swinging it directly up or down and much better adjusted than can be done in the old way of locking the cutter-bar. It will be noticed that I have put the under cutter-knife farther in front than has been done heretofore, so as to have its edge come directly under the center of the revolving cutter-shaft, and by so placing it taller grass can be cut, as the grass will not be pushed over so far out of plumb before it comes in contact with the cutter's edge 46', and it will thus cut a smoother and leveler surface.

The supporting-roller 54, which is covered by the main frame 1 to keep the grass from falling onto and slagging it, is underneath the cutter-bar 45, just back of the under cutter and the forward part of the machine to cut the grass at any desired height, and has for this purpose the sliding hangers 55 and 55'. This supporting-roller 54 is under the cutter-bar 45 between the under cutter 46 and drive-wheel 10 and extends nearly across the machine between the inside of the arms 2 and 3 of the main frame 1 and is journaled to the two upright sliding hangers 55 and 55', fitting between two lugs or ribs 56 and 56', cast on the inside arms 2 and 3 of the main frame. These hangers 55 and 55' have slots 57 extending from the journaled hub 58 to the top, and cap-bolts 59 lie in these slots 57. The other end of the bolts pass through holes 60 in the arms 2 and 3 of the main frame 1, with a nut 61 on the outside to tighten or loosen and thus adjust the supporting-roller 54 to a certain distance from the ground.

Secured forward of the shaft 9 to the curved part of the arm 6 in the rear part of the main frame 1 is a pressure-spring 62, the free end of this spring 62 resting on the forked arm of the lower end of the handle 18, pressing it down, and this spring serves to prevent the front end of the machine from kicking up and allows the machine to run more steadily.

Having thus fully described my invention, what I claim as new, and desire to secure by Letters Patent, is—

1. In a mowing-machine the combination with a frame of a pivoted drive-wheel journaled on the rear of the frame, a driving-shaft journaled above the frame at an angle to the drive-wheel and on one side of said frame, a revolving cutter journaled in said frame, and means connecting said driving-shaft with the drive-wheel and revolving cutter substantially as shown.

2. In a mowing-machine, in combination, a handle-bar provided with a forked piece 18, a frame having a drive-wheel journaled thereon, a cutter-blade positioned forward of said drive-wheel, a rotary cutting-reel journaled on said frame and a straight drive-shaft extending from the rear portion of the main frame between the drive-wheel shaft and the fork-piece 18 and above said main frame and connecting said cutting-reel and drive-wheel for revolving said cutting-reel on the forward movement of the drive-wheel substantially as shown.

3. In a mowing-machine the combination of a frame having a drive-wheel journaled thereon, a cutter-blade positioned forward of the same, a rotary cutting-reel journaled on said frame, a straight driving-shaft inclined diagonally and running above the main frame and connecting said cutting-reel and drive-wheel at the rear of said drive-wheel shaft and means whereby said cutting-reel is revolved by forward pressure applied to said drive-wheel, but remains stationary upon backward pressure to said drive-wheel.

4. In a mowing-machine the combination of a frame having a drive-wheel held on the rear of the same, a cutter-blade positioned on the front of the same, a rotary cutting-reel journaled on said frame and having the center of the shaft directly above the outer edge of said cutter-blade and a straight driving-shaft inclined to the horizontal and at an angle to the drive-wheel and cutting-reel above one side of said frame connecting said cutting-reel and drive-wheel substantially as shown and described.

5. In a mowing-machine the combination of a frame having a drive-wheel journaled thereon, a supporting-roller adjustably attached to said frame forward of said drive-wheel, a stationary cutter provided with a cutter-blade forward of said roller, a spirally-revolving cutter above and forward of the stationary cutter and centered above the outer edge of the cutter-blade, and a driving-shaft running diagonally across one side of said frame connecting the drive-wheel and revolving cutter, substantially as shown.

6. In a mowing-machine having a main frame, a drive-wheel and its shaft journaled in the rear of the frame, a gear-wheel on said shaft, a driving-shaft, a pinion on said driving-shaft and in mesh with the teeth of the gear-wheel, a cutter-shaft in the forward part of the machine and having a bevel-gear at one end thereof, a bevel-gear at the other end of said driving-shaft and in mesh with the gear of the cutter-shaft, the driving-shaft running from a point in the rear of the drive-wheel shaft diagonally across one side of the main frame to a point in the rear of the cutting-reel shaft, substantially as shown and described.

7. In a mowing-machine having a cutter-bar and a knife rigidly secured thereto, a driving-shaft extending diagonally from near the center of the rear of the machine to near one end of the cutter-bar, a supporting-roller between the knife and drive-wheel of the machine, two upright sliding hangers fitting between two ribs cast on the inside of the frame, and having the supporting-roller journaled thereto each hanger provided with a slot extending from the journal-hub to its top and a bolt lying therein and passing through a hole in the frame and a nut for adjusting the supporting-roller, substantially as shown and described.

8. In a mowing-machine the combination of a cutter-bar having a stationary cutter secured thereto on its under side by screws, an upright stand on each end of the cutter-bar, a flange projecting from each upright stand outward and provided with two adjusting-screws, one inserted loosely therein and extending into the frame of the machine, the other threaded into the flange and resting upon said frame, substantially as shown and for the purposes specified.

9. In a mowing-machine having a revolving cutter, a shaft journaled to the frame in the rear of the cutter and carrying a drive-wheel loose on the same, a large driving bevel-gear loose on the same shaft, a pinion meshing in said gear, a friction roller-clutch contained in said bevel-gear, and a drive-shaft extending diagonally above one upper side of said frame for connecting said pinion at the rear of the drive-wheel with said cutter's shaft substantially as shown and described.

10. In combination with a mowing-machine, a handle provided upon one side with an arm in contact with the frame on its under side and on its other side with an arm in contact with the frame on its upper side, substantially as shown and for the purposes specified.

11. In a mowing-machine, the combination with a drive-wheel shaft, of a main frame provided with an arm 6, a pressure-spring secured to the rear part of the arm near the drive-wheel shaft, and a forked handle-bar, the free end of said spring resting on one of the fork-arms of the lower end of the handle, substantially as shown and for the purposes specified.

12. In a cutting apparatus for mowing-machines, the combination with a framework of a rotary cutter, a stationary cutter consisting of a knife secured to a cutter-bar, a roller underneath said cutter-bar, means for pivoting said cutter-bar on said framework, and an upright stand on each end of the cutter-bar having a flange projecting outward and means for adjusting said flange to the main frame.

13. In a mowing-machine, a frame and ears cast on said frame in combination with a rotary cutter, an under cutter pivotally hinged to the ears on the frame, a vertical stand at each end of the under cutter and having a flange at its top projecting outwardly and each flange having two adjusting-screws passing through it for adjusting said under cutter vertically and horizontally, substantially as shown and for the purposes specified.

14. In a mowing-machine, a handle having an arm extending under the framework of the machine, a second arm extending above the framework of the machine and a pressure-spring for keeping said handle-bar in a rigid position substantially as shown and for the purposes specified.

15. In a mowing-machine the combination of a frame having a ground-wheel journaled thereon, a supporting-roller journaled on said frame forward of said ground-wheel, an under cutter pivotally attached to said frame, a rotary cutter centered above said under cutter, a driving-shaft journaled on said frame and extending diagonally across one of its sides and suitable gears at each end of said driving-shaft connecting said ground-wheel and rotary cutter, substantially as shown.

16. In a mowing-machine, a rotary cutter-shaft journaled in the forward part of the machine and carrying at one end a bevel-gear, a drive-wheel shaft in the center of the frame in the rear of the rotary cutter-shaft and having a drive-wheel loosely mounted thereon, a driving-gear mounted loosely on the drive-wheel shaft, a roller friction-clutch connecting the drive-wheel and driving-gear, a shaft placed diagonally across one side of the machine and provided with a pinion at its rear end in mesh with the driving-gear near the center of the rear of the machine and within the framework, and having a bevel-gear at its forward end in mesh with the gear on the rotary cutter-shaft outside of the frame, substantially as shown and described.

In testimony whereof I affix my signature in presence of two witnesses.

ORRIL R. CHAPLIN.

Witnesses:
CHARLES F. A. SMITH,
ROSE E. DOHERTY.